United States Patent [19]

Hjørnevik et al.

[11] Patent Number: 5,993,875
[45] Date of Patent: Nov. 30, 1999

[54] METHOD FOR COOLING AND PRESERVATION OF FISH AND PRODUCTS MADE FROM FISH SUBJECTED TO SUCH TREATMENT

[75] Inventors: Leif Hjørnevik, Skien; Ole Ringdal, Porsgrunn; Freddy Johnsen, Rånåsfoss; Agnar Mjelde, Nattland; Ola Flesland, Rådal, all of Norway

[73] Assignee: Norsk Hydro ASA, Oslo, Norway

[21] Appl. No.: 09/011,038

[22] PCT Filed: Aug. 7, 1996

[86] PCT No.: PCT/NO96/00200

§ 371 Date: Jun. 11, 1998

§ 102(e) Date: Jun. 11, 1998

[87] PCT Pub. No.: WO97/05783

PCT Pub. Date: Feb. 20, 1997

[30] Foreign Application Priority Data

Aug. 7, 1995 [NO] Norway .................................... 953082

[51] Int. Cl.⁶ .................................................... A22C 25/04
[52] U.S. Cl. ........................... 426/327; 426/66; 426/643; 426/326
[58] Field of Search .............................. 426/643, 66, 326, 426/327

[56] References Cited

U.S. PATENT DOCUMENTS

| | | | |
|---|---|---|---|
| 4,207,344 | 6/1980 | Cerrillo | 426/7 |
| 4,220,661 | 9/1980 | Heutson | 424/317 |
| 4,764,383 | 8/1988 | Brown | 426/1 |
| 4,877,410 | 10/1989 | Renzulli | |
| 5,573,797 | 11/1996 | Wilhoit | 426/133 |
| 5,573,800 | 11/1996 | Wilhoit | 426/133 |
| 5,576,801 | 11/1996 | Wilhoit | 426/133 |
| 5,830,522 | 11/1998 | Bean | 426/643 |

FOREIGN PATENT DOCUMENTS

| | | |
|---|---|---|
| 0463284 | 1/1992 | European Pat. Off. . |
| 161595 | 5/1989 | Norway . |
| 1255205 | 12/1971 | United Kingdom . |
| 1596758 | 4/1978 | United Kingdom . |
| WO 84/03718 | 9/1984 | WIPO . |

OTHER PUBLICATIONS

Patent Abstracts of Japan, vol. 12, No. 75, C–480, abstract of JP,A,62–210944 (Chiba Seifun K.K.), Sep. 17, 1987.
Orbit Search Service, File WPAT, Accession No. 93–039162/05, (Kawasaki K. et al.), JP04360643, Dec. 14, 1992 (9305), abstract.
Orbit Search Services, File WPAT, Accession No. 95–347391/45, (Kawasaki H. et al.), JP07236414, Sep. 12, 1995 (9545) abstract.

*Primary Examiner*—Carolyn Paden
*Attorney, Agent, or Firm*—Wenderoth, Lind & Ponack, L.L.P.

[57] ABSTRACT

The present invention relates to a method of cooling and preservation of fish and fish products from thus treated fish. The fish is cooled by a cooling medium in tanks, containers or other suitable facilities, and also subjected to treatment of at least one preservative agent. The fish is subjected to a combined treatment of a cooling medium and a preservative agent and said treatment is performed by means of a cooling medium comprising $C_{1-4}$ monocarboxylic acids and/or mono/di or tetra salts of alkali- and/or earth alkal salts of said acids. The cooling is performed by a cooling medium, being an aqueous solution of $C_{1-4}$ monocarboxylic salts in a concentration of 5–30 weight % salts and 95–70% weight water, or binary ice comprising a preservative agent. The most preferred brine or binary ice comprises potassium formate and/or potassium diformate and/or formic acid. The pH of the brine can be adjusted by addition of an acid or disalt being the equivalent of the monosalt applied in the brine.

7 Claims, No Drawings

METHOD FOR COOLING AND PRESERVATION OF FISH AND PRODUCTS MADE FROM FISH SUBJECTED TO SUCH TREATMENT

This application is the National Stage of International Application No. PCT/NO96/00200 filed Aug. 7, 1996.

BACKGROUND OF THE INVENTION

The present invention relates to a method for cooling and preservation of fish and for products made from fish treated according to said method. The method comprises cooling of the fish by means of a cooling medium in tanks, containers or other suitable facilities.

The problems with present technology in this field are the quality of the raw material delivered to factories etc. for further processing, both with regard to consistency and degradability due to enzymatic and bacterial activity.

It is generally known to cool down the fish raw material to temperatures of 0° to −5° C. in order to slow down the degrading bacterial activity. The fish might for instance be cooled down in tanks on board the ship by circulating sea water or fresh water. The main problem with using sea water is that the NaCl content of the raw material gets too high, thereby giving too high content of this salt in the fish meal. A further consequence of this is that the price the fisherman gets for the fish might decrease with increasing content of NaCl in the fish delivered.

Cooling of the raw material by means of ice or ice-slurry is also generally known. A special type of ice slurry is called binary ice which is a suspension of ice crystals in an aqueous solution. Cooling of for instance fish on board a trawler by means of binary ice will generally cool the fish much quicker than with chilled sea water only. Binary ice as a secondary refrigerant is further described in a paper by J Paul in the 19th International Congress of Refrigeration 1995. Proceedings, Volume IVb, pages 947–954.

Application of preservative agents is also generally known in the art. Thus it is known to add acetic acid or a mixture of acetic acid and about 15 weight % sulphuric acid. The application of acetic acids does, in spite of giving improved quality of the raw material, have several disadvantages. The acid is corrosive to the equipment and requires expensive high quality steel. Those working with this acid have to protect themselves against etching effects of the acid. Further, in order to attain preservative effect the pH should be about 6, but this might cause problems with this acidic agent, as pH<6 could result in autolyses and give problems with the consistency of the fish raw material.

The above known technology is described in the following reports from "Norwegian Herring Oil and Meal Industry Research Institute" (SSF):

Reports from SSF No. 1, 1991, pages 17–20: "Longterm preservation of winter capelin" By Mr. Agnar Mjelde Reports from SSF No.2, 1990, pages 7–12: "Fresh water-cooling of blue whiting" By Mr. Tor Larsen Reports from SSF No. 1, 1989, pages 4–8: "Preservation by acetic acid ready for practical use?" By Mr. Tor Larsen

SUMMARY OF THE INVENTION

The main object of the present invention was to develop a new method for treatment of fish to attain a fish raw material which could be stored for an extended period of time and still have improved quality both with regard to consistency and composition implying being less degraded than that experienced with presently available technology.

Another object was to obtain fish products having improved quality and being low in NaCl content.

These objects can be accomplished by cooling the fish, immediately after being caught, in a cooling medium comprising an aqueous solution of formic acid and/or mono/di or tetra salts of ammonium of alkali and/or earth alkali salts of the acid.

DESCRIPTION OF THE PREFERRED EMBODIMENTS

From previous experience it was known that cooling of the fish, and preferably as rapidly as possible, had a positive effect on retarding the degrading activity of the raw material. The inventors therefore started by looking into the cooling step of the treatment process. Application of sea water had been found to have some disadvantages, and the first problem was to find a new and useful cooling medium. To avoid contamination of the fish by NaCl one looked for other salts which could give a brine having crystallization temperatures being suitable for cooling the fish down to about −5° C. In this connection it was also considered how the preservative aspects could be taken care of. Knowing that acetic acid had some preservative effects, one investigated salts of the acid and similar acids. It was then found that salts of $C_{1-4}$ monocarboxylic acids possibly would have the desired preservative effects. Such salts include also double or di-/tetra salts of such acids. Further investigations proved that these salts, if added in suitable concentrations to the fish raw material, would retard the undesired degrading activity. During these investigations various aqueous mixtures of such salts were made and the crystallization temperatures of the mixtures were measured. It was then found that useful brines for cooling the fish could be based on aqueous salt solutions of $C_{1-4}$ monocarboxylic acid salts. Special tests were performed using aqueous mixtures of potassium formate. Such mixtures gave a pH of about 8, which was considered to be somewhat high as the desired pH would be pH 6–7, but this could easily be adjusted by adding minor amounts of formic acid or potassium diformate to the solution or brine.

It was found that alkali and/or earth alkali salts of said C, acids could be used for preparation of useful brines. The most preferred salt would be potassium-, sodium-, or ammonium salts of said acids, and the most preferred acid proved to be formic acid. It is also preferred to use only one type of salt and adjust the pH with the equivalent acid, for instance potassium formate and/or potassium diformate having its pH adjusted with formic acid. However, it is within the inventive concept to make the brine from mixtures of mono/di- or tetra salts of $C_{1-4}$ monocarboxylic acids.

The concentration of formate, acetate etc. in the brine should be above 5–7 weight % to avoid bacterial growth during storage of the fish. Further tests showed that the brine should have 530 weight % salts of $C_{1-4}$ monocarboxylic acids and 95–70 weight % water. Such brines would give a temperature of the brine of about −2 to −20° C., whereby the fish could be cooled to 0 to −7° C. The fish was preferably cooled down to the region of −2 to −4° C.

Based on the positive result of forming brines from the acid salts, the question of using a similar concept applying ice or ice-slurries was raised. The possibility of applying binary ice as cooling medium was considered to be the most interesting concept. Investigations were therefore started regarding formation of binary ice from solutions comprising preservatives like $C_{1-4}$ acids or their salts. Various solutions of such salts and/or their acids were made, and then these solutions were diluted with water and binary ice were made. The formed slurry was then drained with respect to liquid, and a thick slurry was formed comprising about 40% liquid and about 60% ice. This slurry was then used for cooling and preserving the fish raw material. Special test series were performed on slurry made from potassium diformate and formic acid in a ratio of about 3:1. This solution was diluted with water till it contained 7 weight % of the formate/formic acid solution. Treatment of fish raw material with binary ice from said solution was then compared with treatment of the raw material with ice. During these tests 25% of binary ice and 15% of pure ice, respectively, were used compared to the fish raw material. It was then found that the binary ice comprising preservant gave far better results than application of ice with regard to rapid cooling, preservation, development of volatile nitrogen and consistency of the raw material which could be stored for a surprisingly long period compared to conventionally treated raw material. The meal product from thus treated fish raw material was then analyzed with regard to absorption of potassium, formate, and free volatile nitrogen. The results of these analyses showed that the product quality was excellent. Further investigations showed that similar effects could be obtained with other cooling media by applying binary ice formed from aqueous solutions containing a preservant comprising $c_{1-4}$ monocarboxylic acids and/or their salts.

Treatment according to the invention of the fish could be made in different ways. Thus the fish could be cooled down in tanks with circulating brine or ice slurry comprising preservant. The coolant could be removed when the fish had attained the desired temperature. Then, during unloading and/or storage at the factory, additional treatment of the fish with such coolant could be performed. The type of fish for which the new method is applicable comprises fish subject to processing to meal, oil etc. Even some types of consumer fish could be subject to similar treatment. The most common will be herring, sand eel, mackerel, caplin and blue whiting.

Thus, according to the invention the fish is subjected to a combined treatment of a cooling medium and a preservative agent. Said treatment is preferably performed by means of a cooling medium comprising $C_1$ monocarboxylic acids and/or mono/di or tetra salts of ammonium or alkali- and/or earth alkali salts of said acids.

According to one feature of the invention the cooling is performed by means of a brine, being an aqueous solution of $C_{1-4}$ monocarboxylic salts in a concentration of 5–30 weight % salts and 95–70 weight % water. Preferably the brine comprises substantially an aqueous solution of potassium formate and/or potassium diformate, and the brine has a concentration of 5–30 weight % of said salts.

The pH of the brine can be adjusted to pH 6–7 by addition of an acid or disalt being the equivalent of the monosalt applied in the brine.

The fish can be given a cooling and preservative treatment immediately after being caught and also at unloading and/or storage before being processed to meal, oil etc.

Another feature of the invention comprises that there is applied a cooling medium consisting of a mixture of ice and liquid comprising a preservative agent. The most preferred ice/liquid mixture is in the form of binary ice or an ice-slurry comprising a preservative. The binary ice should contain 1–6 weight % of a preservative, preferably potassium diformate and/or formic acid.

Products according to the invention comprise fish meal or oil made from raw material subjected to a combined treatment of cooling and preservative. The fish meal according to the invention should have a content of NaCl being <0.5 weight %.

Further, the product can be fish partially frozen by the applied cooling medium comprising a preservative.

The scope and special features of the invention are as defined by the attached claims.

The invention will be further explained in the following examples.

EXAMPLE 1

The crystallization temperatures for brines containing 0–15 weight % potassium formate were investigated. The experiments were performed in a 200 ml jacketed glass vessel connected to a thermostated circulator with high accuracy and agitated with a magnetic stirrer. The temperature measurement in the vessel was done with a temperature sensor calibrated to give an accuracy of ±0.1° C. and it was connected to a continuous plotter. The brine in the vessel was slowly cooled until crystallization started. The plotter made it possible to watch the supercooling before crystallization occurred. The approximately constant temperature observed in the ice slurry some time after crystallization, was registered as the crystallization temperature. The results of the experiments are shown in the following table.

TABLE 1

| Concentration weight % | Crystallization temperature ° C. |
| --- | --- |
| 0.00 | 0.0 |
| 3.00 | −1.3 |
| 6.00 | −2.7 |
| 9.00 | −4.8 |
| 12.95 | −7.4 |

EXAMPLE 2

This example shows the effect on sand eel cooled in a brine containing 9 weight % potassium formate and having a crystallization temperature of −4.8° C. The fish was cooled till the temperature in the fish raw material was −2.5° C. before the brine was drained off. Then the fish was stored for two days and its NaCl content was measured to 0.3%, which is very low compared to 1.5–2% in sea water cooled fish. Volatile nitrogen was found to be substantially lower than that for sea water cooled fish. When such a raw material was further processed to meal, the press cake was found to have far better consistency than normally experienced, indicating lower loss of valuables to the filtrate. The NaCl content of the meal was lower than in meal from sea water cooled fish, corresponding to the difference observed in the raw material.

EXAMPLE 3

This example shows treatment of fish raw material from sand eel by ice from fresh water and a binary ice cooling medium, respectively. The binary ice is made from a solution containing 7 weight % of a preservative. Three parts solid potassium diformate and one part 85% formic acid were diluted in water to form the 7% solution. This solution gave an initial freezing point of −3° C. It was then produced a binary ice slurry, and liquid was drained from the slurry till it contained about 40% liquid and about 60% ice. The resulting cooling medium contained 2.8% of the preservative. 25% of this binary ice slurry and 15% of pure ice compared to the amount of fish raw material will have about the same cooling effect. In this example and its Table II, binary ice means a binary ice comprising a preservative.

868 kg fresh sand eel were placed in five 400 liter vessels for treatment with fresh water ice or the above described binary ice. The results of the treatments were measured with regard to quality of the products expressed as Total Volatile Nitrogen (TVN, mg N/100 grams) as function of storage time in days. The results are shown in the following Table II.

Partial freezing of fish for consume by means of the above type binary ice comprising preservative were also tested. Especially small fish like caplin and herring gave most acceptable products.

By the present invention the inventors have succeeded in arriving at a new and improved method for treatment of fish for consumption or prior to its processing to meal etc. The quality of the raw material and the finished products are better than known ones and the process does not have the

TABLE II

| Vessel | Fish Kg | Treatment (ice) | Coolant Ratio % | TVN Day 0 | TVN Day 1 | TVN Day 2 | TVN Day 3 | TVN Day 4 | TVN Day 5 | TVN Day 6 | TVN Day |
|---|---|---|---|---|---|---|---|---|---|---|---|
| 1 | 300 | Binary | 25 | 13.8 | 9.2 | 11.5 | 16.1 | | | | |
| 2 | 300 | Pure | 15 | 13.8 | 14.9 | 27.0 | 28.11 | | | | |
| 3 | 100 | Binary | 25 | 13.8 | 13.2 | 21.2 | 20.7 | 28.7 | 44.8 | | |
| 4 | 100 | Pure | 15 | 13.8 | 20.7 | 41.3 | 55.1 | 84.4 | 105 | | |
| 5 | 68 | Binary | 25 | 13.8 | 10.3 | 18.9 | 16.1 | 31 | 27.6 | 39.6 | 101 |

Day 0 indicates start of the experiments, before that the fish was stored about 17 hours at 8–9° C.

As can be seen from Table II, fish treated according to the invention, i.e with binary ice comprising preservative, got far lower TVN values during storage than fish treated with pure ice. Thus, after 5 days of storage volatile nitrogen was only 44.8 mg/100 gram for fish treated according to the invention compared to 105 mg/100 gram for fish treated with pure ice.

Analysis of meal and oil from fish raw material treated according to this experiment showed that these products contain only slightly higher values for potassium and formate content when the fish was treated with the binary ice than when it was treated with pure ice. The increase in potassium content was 0.13–0.19% in the raw material resulting in an increase in the meal of 0.72–0.78%. The formate content in raw material increased 0.44–0.62%, resulting in an increase in the meal of 2.4–2.6%. Said increases did not reduce the quality of the final products and are of no importance compared to the great advantages obtained in reduction of TVN.

Further investigations showed that the concentration of preservative in the binary ice could be varied within fairly wide limits. However, the most practical limits when potassium diformate/formic acid were used proved to be in the range 2–6%, preferably 3–4.5% preservative in the applied binary ice slurry. Corresponding ranges were found for the other $C_{1-4}$ salts and corresponding acids.

Tests were also performed using formic acid, acetic acid, and potassium diformate, respectively, as preservative agent in the cooling medium. These test showed similar results with regard to reduction in TVN value compared with those for pure ice. Application of pure acids were however considered negative because of their negative properties with regard to corrosion and environment/working conditions.

limitations and disadvantages of known processes. The unique combination of a cooling medium, ice slurry, including binary ice, and brine, with a preservative agent gives a cost efficient total treatment process which extends the period of time the fish can be stored before being processed and still giving high yield of high quality products. The coolant and preservative agent is not hazardous to the people which can be exposed to it.

We claim:

1. A method of cooling and preserving fish, comprising forming a cooling and preservative mixture comprising 1–6 weight % of a preservative being an aqueous solution of formic acid and/or mono/di or tetra salts of ammonium or alkali and/or earth alkali salts of said acid, subjecting fish, immediately after being caught to the cooling medium under conditions sufficient to cool and preserve the fish.

2. A method according to claim 1, wherein the cooling medium is a brine being substantially an aqueous solution of potassium formate and/or potassium diformate having a concentration of 5–30 weight % of said salts.

3. A method according to claim 1, wherein the cooling medium is a brine having a pH adjusted to pH 6–7 by addition of formic acid or disalt being the equivalent of the monosalt applied in the brine.

4. A method according to claim 1, wherein the cooling medium is a mixture of liquid and ice in the form of binary ice or an ice-slurry comprising a preservative.

5. A method according to claim 1, wherein the cooling medium is binary ice containing 1–6 weight % of a preservative comprising potassium diformate and/or formic acid.

6. A fish product made by the method of claim 1.

7. A fish product from fish treated according to claim 1, wherein the product is fish partially frozen by the applied cooling medium.

* * * * *